W. NEWELL.
Coffee Cleaner.
No. 30,083.
Patented Sept. 18, 1860.
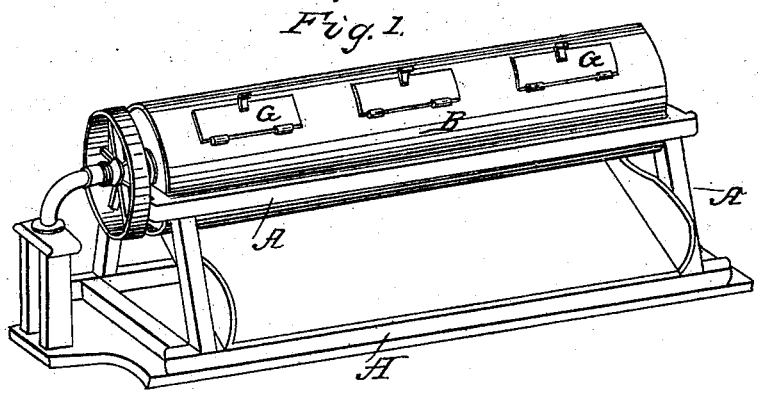
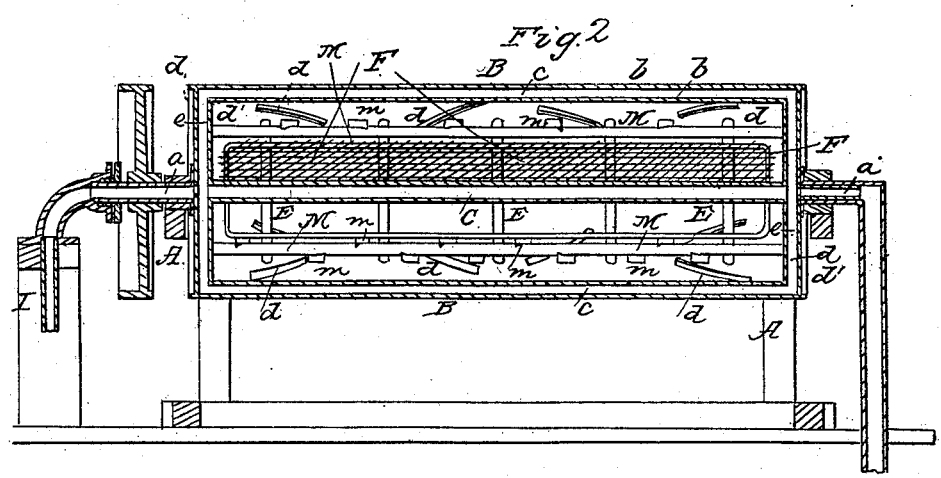
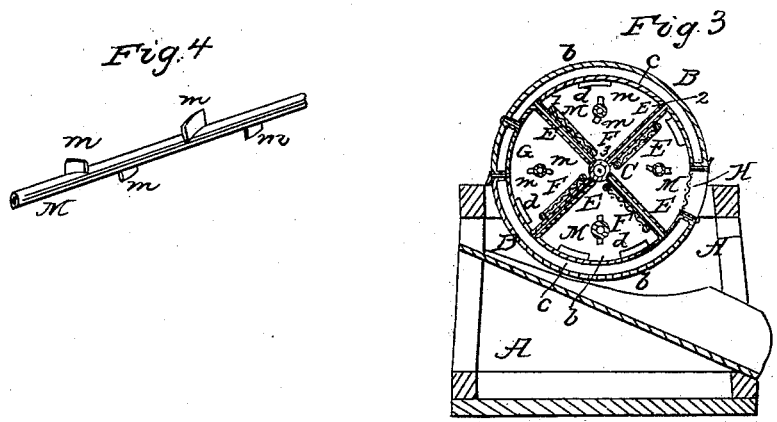
Witnesses
E. Cohen
J. Hush
Inventor
William Newell
by attorneys
A. B. Stoughton

UNITED STATES PATENT OFFICE.

WILLIAM NEWELL, OF PHILADELPHIA, PENNSYLVANIA.

APPARATUS FOR CLEANING, DRYING, AND POLISHING COFFEE, &c.

Specification of Letters Patent No. 30,083, dated September 18, 1860.

*To all whom it may concern:*

Be it known that I, WILLIAM NEWELL, of the city and county of Philadelphia and State of Pennsylvania, have invented certain new and useful Improvements in an Apparatus for Cleaning, Polishing, and Drying Coffee and other Produce, Such as Grain, Beans, Peas, &c.; and I do hereby declare that the following is a full, clear, and exact description of the construction and operation of the same, reference being had to the accompanying drawings, in which—

Figure 1 represents a perspective view of said apparatus. Fig. 2 represents a longitudinal vertical section through the same. Fig. 3 represents a vertical cross section through the same. Fig. 4 represents a detached view hereafter to be referred to.

My invention relates to an improvement on my apparatus for cleaning and polishing coffee for which Letters Patent of the United States were granted to me on November 3, 1857, and on July 13, 1858, by which I am enabled not only to clean and polish coffee, but also to dry and clean grain and other produce which has been affected by moisture, thereby restoring the same to a salable article.

To enable others skilled in the art to make and use my invention, I will proceed to describe its construction and operation.

The general construction of my apparatus is similar to the one patented to me on July 13, 1858.

A represents the frame of the machine upon which the cylinder B is supported by the hollow journals $a$.

The cylinder B, is composed of two jackets $b$, having steam spaces $c$, between them. It also has double heads $d'$, which inclose the steam spaces, $e$.

C, represents the central steam pipe the branch-pipes E, of which connect with the steam spaces $c$.

F, represents partition screens which are secured to the branch pipes, E. The coffee or grain to be cleaned on being thrown on said screens by the revolution of the cylinder passes over the outer edges and strikes against the oblique flanges, $d$, which are secured to the inner circumference of the inner cylinder. The cylinder is provided with two sets of doors G, H, the former of which are made of solid material and while the latter are screen doors through which the fine material which is rubbed off the grains, passes. The cylinder is heated by the introduction of steam through the pipe I the steam passing through the hollow journal into the steam spaces $c$, $e$, and into the pipe, C, and its branch pipes E.

Thus far the principle of this apparatus is similar to the one patented to me July 13, 1858. I have found, however, by further experiments that by adding to this apparatus steam pipes by means of which a more general heat is diffused through the cylinder and by the application of additional rubbing surface. This apparatus may equally well be applied to the restoration of grain or other vegetable matter which has been affected by moisture. For this purpose I have inserted into the cylinder a number of longitudinal steam pipes M, which are connected with the steam spaces $e$, and which are provided on their outside with oblique flanges, $m$, which are secured in spiral lines on their circumferences as represented in Fig. 4. The position of these pipes is represented in Fig. 3. It is obvious that by passing through the center of the triangular spaces or spandrels 1, 2, 3, they cause a more general heat to diffuse through this apparatus than was the case in my former apparatus, while the action of the flanges $m$, is such that when the grain passes over the edges of the screens, F, it is partially thrown against the flanges, $d$, and partially against those of the pipes, M, or rebounds from the one to the other.

I have found by actual experiment that by this machine, grain, as well as other cereals, such as beans &c., which had been affected by moisture, can be perfectly restored by this machine as the scouring and polishing which is performed under the generally diffused heat, dries the same and restores them to their former purity and smoothness.

Besides drying and polishing coffee, corn, and grains and cereals of all kinds, I also treat, or propose to treat pepper, allspice, and other spices. All grains, and berries, are subject to moisture in transportation, and become heated or moldy thereby. I propose to dry, and polish all such grains, and berries by subjecting them to heat and friction as herein set forth.

Having thus fully described the nature of my invention, what I claim herein as new, and desire to secure by Letters Patent, is—

In combination with a revolving double jacketed cylinder with steam space between them, and doors communicating with the interior thereof—the arrangement of the wire rubbing surfaces F, the flanges d, radial heating tubes, E, and the flanged longitudinal heating tubes M, for the purpose, and in the manner herein set forth.

WM. NEWELL.

Witnesses:
JOSEPH KER,
I. SPERRY NILLING.